United States Patent [19]

Oguino

[11] 4,322,746
[45] Mar. 30, 1982

[54] CROSSTALK ATTENUATOR SYSTEM

[75] Inventor: Masanori Oguino, Yokohama, Japan

[73] Assignee: Hitachi, Ltd., Tokyo, Japan

[21] Appl. No.: 82,025

[22] Filed: Oct. 5, 1979

[30] Foreign Application Priority Data

Oct. 6, 1978 [JP] Japan .............................. 53-122590
Oct. 6, 1978 [JP] Japan .............................. 53-122591

[51] Int. Cl.³ ................... H04N 5/76; H04N 5/21; G11B 5/02
[52] U.S. Cl. .................... 358/127; 358/167; 358/198; 360/20; 369/61
[58] Field of Search ............ 358/8, 127, 128.5, 128.6, 358/167, 196–198; 360/19, 20, 30; 179/100.1 G, 100.1 GN, 100.3 M, 100.4 C; 455/295, 303–306; 369/61, 62

[56] References Cited

U.S. PATENT DOCUMENTS

| | | | |
|---|---|---|---|
| 3,371,154 | 2/1968 | Frohbach et al. | 358/128.6 |
| 3,663,747 | 5/1972 | Janssen | 455/295 X |
| 3,830,968 | 8/1974 | Redlich et al. | 358/167 X |
| 4,051,533 | 9/1977 | Griffiths | 358/167 |
| 4,199,786 | 4/1980 | Orii | 358/197 |
| 4,211,978 | 7/1980 | Takahashi | 455/295 X |
| 4,237,485 | 12/1980 | Saito et al. | 455/304 X |

*Primary Examiner*—Aristotelis M. Psitos
*Attorney, Agent, or Firm*—Craig and Antonelli

[57] ABSTRACT

Disclosed is a crosstalk attenuator system for reducing the crosstalk which occurs at the time of separating and reproducing the original signals from the video disc recording medium on which a video signal and a voice signal have been recorded as a compound signal on the same track. In the system, a first multiplier receives both the signals separated from the medium to analyze the relative relation between the signals and thus to generate an output signal according to the amount of the crosstalk between the signals; a second multiplier receives the output signal and one of the signals to generate a feedback signal equivalent to the other crosstalk signal component mixed in one signal, and the feedback signal is subtracted from the other signal component thereby to reduce the crosstalk.

5 Claims, 7 Drawing Figures

F I G. 6
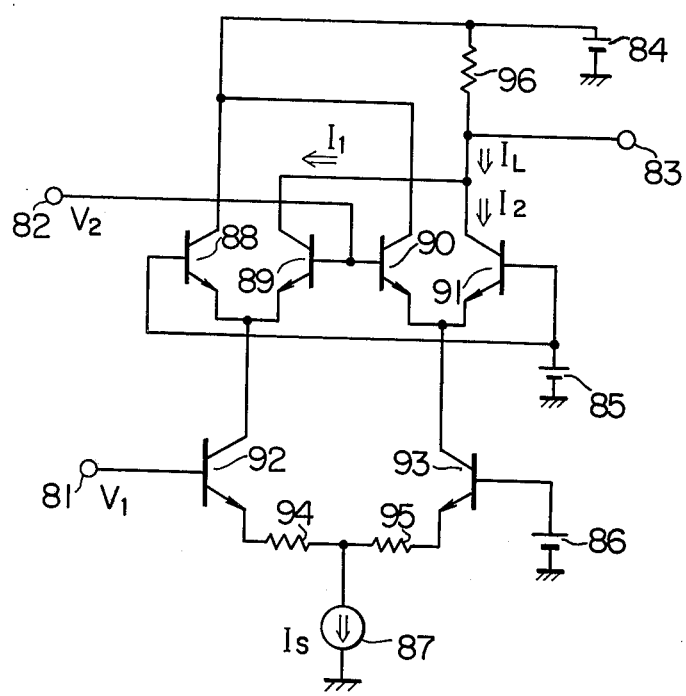
F I G. 7
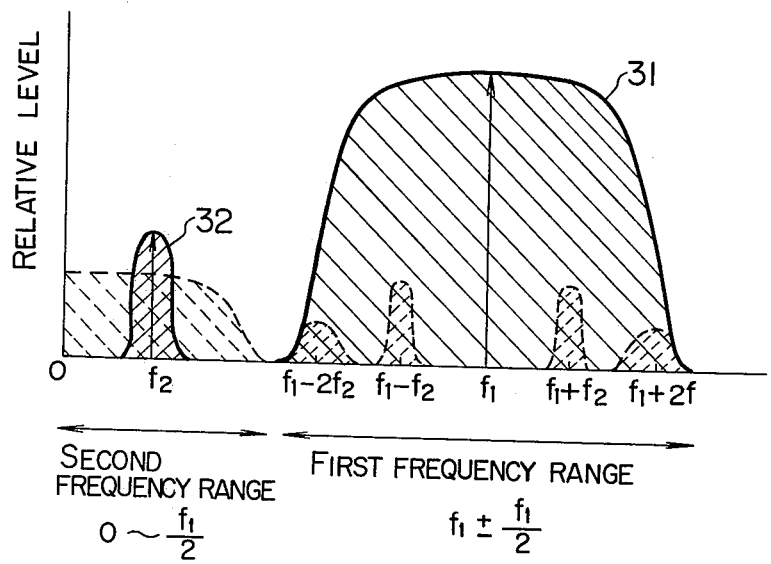

CROSSTALK ATTENUATOR SYSTEM

BACKGROUND OF THE INVENTION

1. Field of the Invention

This invention relates to a crosstalk attenuator system in which a high-frequency main signal and a low-frequency sub-signal are frequency multiplexed and recorded as a compound signal on a recording medium, and the crosstalk between the high-frequency signal and low-frequency signal is reduced at the time of separating, demodulating and reproducing the original information signals from the recording medium.

2. Description of the Prior Art

In general, there is empoloyed a system for video devices (as a typical example, video disk players), in which a signal is recorded on a recording medium such as a disc on a high-density basis, that is, a video signal and a voice signal are multiplexed and recorded as a compound signal in an identical track on the recording medium and at the time of reproducing the compound signal, the original video and voice signals are separated from the compound signal.

One of the problems in such a system in which a plurality of signals are multiplexed, recorded and reproduced is that crosstalk tends to occur due to the interference between the signals.

Now, explanation will be made with reference to a typical video disk player, about how such crosstalk occurs.

On the surface of a rotary disc used in the video disk player, a spiral recording track is provided in a similar way to an audio recording disc, and a video signal and a voice signal are recorded in the track as a multiplexed compound signal. In this case, there are two ways of recording signals on the disc; one is that a spiral track is provided on the disc surface to record signals in a similar way to an audio recording disc, and the other is that there is no track on the disk surface. In an example of the recorded compound signal, the video signal is FM modulated with a carrier of about 8 MHz and the voice signal is FM modulated with a carrier of about 2 MHz.

In the above-mentioned recording process, how crosstalk occurs will be explained with reference to FIG. 1.

In FIG. 1, there is shown a video player employing a light system in which a compound signal is optically recorded on a recording medium such as a rotary disc, and later the compound signal is extracted from the rotary disc and demodulated into the original video and voice signals. In the figure, the upper part shows the recording process of the video disk player and the bottom part shows the reproducing process thereof.

A video signal is supplied to an FM modulator 1 which FM modulates it with a carrier of about 8 MHz. The output signal from the FM modulator 1 has a frequency range of about 8 MHz±4 MHz. Similarly, a voice signal is applied to an FM modulator 2 where the signal is FM modulated with a carrier of about 2 MHz. The output signal from the FM modulator 2 has a frequency range of about 2 MHz±0.1 MHz. The output signals from the FM modulators 1 and 2 are added together at an adder 3 and applied to a limiter 4 which shapes the added signal into a rectangular pulse.

The frequency change in the rectangular signal obtained from the limiter 4 indicates the FM composition resulting from the video signal, and the duty factor change in the rectangular signal indicates the FM composition resulting from the voice signal.

The rectangular signal is recorded into a spiral track on a rotary disc by means of a light beam recorder 5. In the recording process, the positive parts of the rectangular signal correspond to the transparent mode in which light can pass, and the negative parts thereof correspond to the opaque mode in which light can not pass.

On the other hand, in the reproducing section of the video player, the compound signal is detected from the rotary disc by the use of a light beam reader 6 and is applied to a high-pass filter 7 which extracts the repeated frequency component out of the rectangular signal. The extracted component signal is fed to an FM demodulator 9 to demodulate it into the original video signal. On the other hand, the compound signal read from the rotary disc is also applied to a band pass filter 8 which in turn takes the duty factor change out of it. The duty factor change is demodulated at an FM demodulator 10 into the original voice signal. In such a video disc player system, crosstalk is caused to occur in the above-mentioned limiter and light beam recorder 5.

First, explanation of crosstalk from the voice signal to the video signal will be given.

Assume that cos ωt as a frequency-modulated (FM) video signal and A cos at+X as a frequency-modulated (FM) voice signal are applied to the limiter 4. Where, A is a constant and usually is selected to be 0.1, and X is an offset of the slice level.

If the video signal is 0, then the duty factor in the rectangular signal obtained from the limiter 4 will be 50% so that the duty factors for the transparent mode and the opaque mode to be recorded on the rotary disc are each 50%.

However, the use of a photo-resist technique in the actual light beam recording process will inevitably cause deviation in the duty factor to a certain extent. The deviation usually ranges from 40% to 60% and corresponds to ±0.31 of offset X.

Under such conditions, if the output signal from the limiter 4 is checked in waveform, then the video FM signal will be 1 in amplitude. However, it has been found that the amplitude of the video FM signal is actually amplitude modulated with the voice FM signal and can be expressed as follows:

$$1 + \frac{X^2 + 2XA \cos at + \frac{A^2(1 + \cos 2at)}{2}}{2} \tag{1}$$

As will be seen from the above expression, when offset X is 0, the system will generate a side band of two times the frequency ($2a$) of the voice FM signal frequency.

If offset X is not equal to zero, the system will generate a side band resulting from the fundamental wave of the voice FM signal, in addition to the above-mentioned side band. The modulation factor is $A^2/4$ with respect to the second order wave, and $X \cdot A$ with respect to the fundamental wave.

Now, consider that A=0.1 and X=0.31; then it will be found that the modulation factor of the side band resulting from the fundamental wave is greater by 12 times than that resulting from the second harmonic wave and is the dominant factor. The modulation factor due to the second order wave is a constant, whereas that due to the fundamental wave varies depending upon variation in the offset.

Such distortion resulting from the amplitude modulation would be removed later by limiting and then FM demodulating the amplitude, as long as the amplitudes and phases of the upper and lower side-bands are transmitted without change in the course of processing the video disc signals.

However, these sidebands are actually subjected to change in the aperture characteristic during the reading operation due to the light beam and to distortion in the phase characteristic of the amplifiers included in the signal processing section, which makes it difficult to transmit signals with complete fidelity. This will involve mixing such distortion as crosstalk into the output of the FM demodulator 9.

As a result, the voice FM signal is mixed partly in the video signal and appears on the reproducing display as a beat interference of about 2 MHz, thus deteriorating the picture quality.

Next, explanation of crosstalk from the video signal to the voice signal will be made.

As has been described above, the size of the transparent or opaque part on the rotary disc will change due to various factors, that is, be larger or smaller than the selected size, during the recording process. Now, assume that the size of the transparent part is larger than the selected size and the size increment corresponds to 30% of the wave length to be recorded on the disc of the black level signal (in this case, the frequency of the FM carrier is 8 MHz) in the video signal. Then, the increment corresponds to $30\% \times 9.2/8 = 34.5\%$ when it is evaluated with reference to the recording wave length of the white level signal (the frequency of the FM carrier at the white level is 9.2 MHz).

Essentially speaking, any change in the duty factors of the transparent and opaque parts recorded on the disc must depend merely on the voice FM signal required to record and reproduce the voice signal, and the duty factor must not depend on the video signal. In fact, the change in the duty factors depends partly on the video signal so that the voice FM signal is also modulated with a base band signal in the video signal, that is, the base band spectrum of about 2 MHz is mixed into the output of the band-pass filter 8 (see FIG. 1). In an extreme case, the level of the base band spectrum is greater than that of the voice signal carrier, which causes noise known as buzz interference during the reproducing operation thereby causing significant deterioration in the quality of the reproduced voice signal.

In addition, there is a mutual relation between the two types of crosstalk produced in the recording and reproducing system. More specifically, there exists an inconsistent problem, that is, a decrease of one crosstalk will cause an increase of the other crosstalk. For example, when the relative recording level of the voice FM signal is increased to decrease the buzz interference in the voice signal, beat interference will increase on the display. On the other hand, if the level of the voice signal is decreased, the beat interference on the display will decrease. The buzz interference in the voice signal will increase correspondingly. For this reason, the types of crosstalk must be counter-balanced, in the actual application. It will be understood from the foregoing that it is difficult in the prior art technique to get a video disc player which meets both the conditions of high picture quality and high voice quality by reducing crosstalk. Further, such a crosstalk problem is regarded as a common problem in a higher frequency system in which a main FM signal and a lower frequency sub-signal are provided in the frequency multiplex mode.

SUMMARY OF THE INVENTION

It is an object of the present invention to provide a crosstalk attenuator system which possesses none of the aforedescribed disadvantages in the prior art technique and which cancels the crosstalk properly at the time of recording and reproducing the multiplexed signal and eliminates both the video beat interference and the voice buzz interference.

To attain this, the present invention contemplates a unique arrangement wherein the respective signal component or equivalent is taken out of one signal conductive channel for producing a video signal and the other signal conductive channel for producing a voice signal, and is sent to relative analysis means which analyzes the relative relationship between the component of both the video and voice signals. If crosstalk between both the signal channels occurs, since one signal is partly added into the other signal, there will exist a relative relation between both the signals. If there is no relative relation between the two input signals which are supplied to the relative analysis means, the output of the relative analysis means is zero. If there is any relative relation therebetween, the output of the relative analysis means is proportional to the relative strength between both the signal components.

The relative analysis means detects the relative relation between both the signals and sends it to feedback signal generating means.

The feedback signal generating means receives the above-mentioned one signal component and the above-mentioned output signal from the relative analysis means and supplies said one signal component as a feedback signal according to the amplitude and polarity of said output signal. In other words, the feedback signal corresponds to the crosstalk amount by which one signal component is added to the other signal.

The feedback signal is applied to compensation means which is inserted in series with the other signal transmission channel. The compensation means receives the feedback signal and mixes (subtraction operation) it with the other signal component.

When the video signal is partly mixed into the voice FM signal as crosstalk, since the voice FM signal is conducted with part of the video signal, the video signal part is used as a feedback signal according to the crosstalk amount. Then, the compensation means subtracts the feedback video signal from the video FM signal plus the video signal part thus to provide the voice FM signal with a reduced crosstalk.

On the other hand, when the voice FM signal is partly mixed into the video signal, since the video signal is conducted with part of the voice signal, the voice FM signal part is used as a feedback signal according to the crosstalk amount. Then, the compensation means subtracts the feedback voice FM signal from the video signal plus the voice FM signal part thus to provide the video signal with a reduced crosstalk.

According to the present invention, both crosstalks due to the video and voice FM signals can be reduced.

BRIEF DESCRIPTION OF THE DRAWINGS

FIG. 6 is a circuit diagram of an embodiment of a multiplier used in the present invention.

FIG. 7 is an example of graphical representation of the relation between the relative level and signal spectrum of the system in which the present invention is applicable.

DESCRIPTION OF THE PREFERRED EMBODIMENTS

The present invention will now be explained with reference to the preferred embodiments in conjunction with accompanying drawings.

Figure 2:
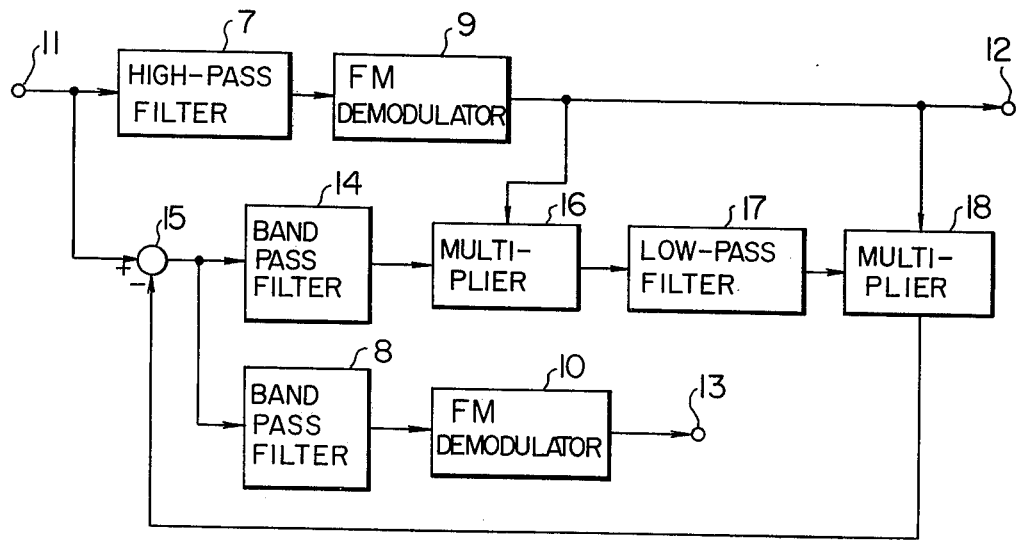
FIGS. 2 to 5 are block diagrams of different embodiments of crosstalk attenuator systems according to the present invention.

Turning now to FIG. 2, there is shown a first embodiment according to the present invention which reduces voice signal buzz interference. For brevity of the explanation, the same corresponding numerals are attached respectively to the same parts or circuits all over the drawings.

Figure 1:
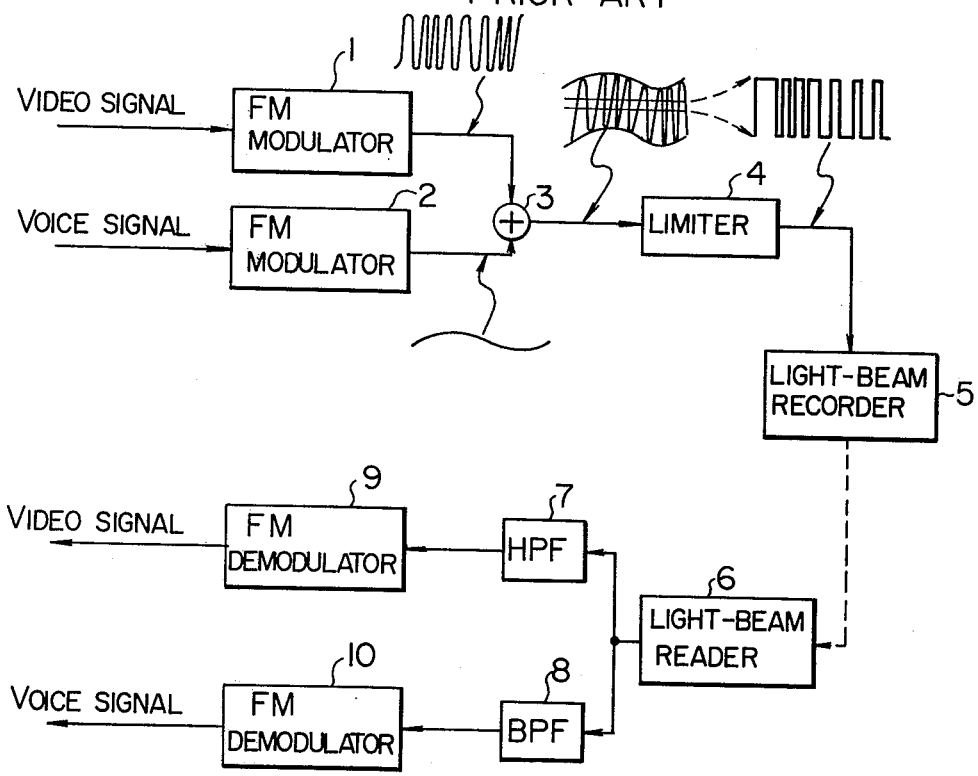
FIG. 1 is a block diagram of a conventional video disc player system, for explanation of how cross-talk occurs between a video signal and a voice FM signal.

In the figure, a compound signal is supplied through an input terminal 11 from the light-beam reader (see FIG. 1, reader 6). Through an output 12, is sent the demodulated video signal. Further, 13 is an output terminal through which the demodulated voice signal is sent.

A high-pass filter 7 functions to pass the video FM signal of 8 MHz±4 MHz to an FM demodulator where the video FM signal is demodulated.

On the other hand, a band pass filter 8 is provided to pass the voice FM signal of 2 MHz±0.1 MHz to an FM demodulator 10 where the voice FM signal is demodulated.

A band pass filter 14 acts to pass signal components of a band within less than 4 MHz, excluding the voice FM signal (2 MHz ±0.1 MHz).

15 is a subtractor, 16 is a first multiplier, 17 is a low-pass filter, and 18 is a second multiplier where a feedback signal is generated.

In the operation of the embodiment of FIG. 2, a signal applied to the input terminal 11 from the light-beam reader 6 (see FIG. 1) will cause the high-pass filter 7 to pass the video FM signal in frequency band of 8MHz ±4 MHz. The passed video FM signal is supplied to the FM demodulator 9 which in turn demodulates the video signal. The demodulated video FM signal is applied to the output terminal 12. On the other hand, the input signal is applied through the subtractor 15 to the band pass filter 8 which extracts the voice FM signal of 2MHz ±0.1 MHz. Then the extracted voice FM signal is supplied to the FM demodulator 10 which demodulates it into a voice signal to feed it to the output terminal 13.

The input signal from the subtractor 15 is also provided to the band pass filter 14 which in turn passes the signal components of a band within less than 4 MHz, excluding the voice FM signal (2 MHz±0.1 MHz).

The signal components passed from the band pass filter 14 are delivered to the first multiplier 16 which multiplies it by the video signal from the FM demodulator 9. The first multiplier 16 (which will be explained in detail) includes a known balanced modulator and operates to produce an output only when there is some correlation between the signal components from the band pass filter 14 and those from the FM demodulator 9.

In other words, if these two input signals to the first multiplier 16 have no correlation to each other, then the output from the multiplier 16 will be zero. If there is a positive correlation therebetween, then the output will be positive, and if there is negative correlation, then the output will be negative. In this case, the absolute values of these positive and negative outputs will be proportional to the relative strength of the input signals.

The output of the first multiplier 16 is connected to the low-pass filter 17 which in turn passes only the low frequency components to apply then as a control signal to one input of the second multiplier 18.

The second multiplier 18 generates a feedback signal according to the amplitude and polarity of the control signal from the low-pass filter 17, in order to control the amplitude and polarity of the video signal from the FM demodulator 9. The feedback signal is fed to a subtraction input of the subtractor 15 so that the input signals subtracted by the feedback signal are applied to the band pass filters 8 and 14.

Now, assume that in a signal from the light-beam reader 6 (see FIG. 1), there is completely zero crosstalk of the video signal with respect to the band of less than 4 MHz including the voice FM signal. Since there is no correlation between the output signal from the band pass filter 14 and the video signal from the FM demodulator 9, the output of the first multiplier 16 will remain zero so that the control signal to the second multiplier 18 will be zero. Thus, the feedback signal will be supplied as a zero signal from the multiplier 18 to the subtractor 15. This means that the output signal from the subtractor 15 is applied to the band pass filters 8 and 14 without change so that the band pass filters 8 produces the original voice FM signal.

However, in practice, crosstalk of the video signal to the voice FM signal in the input signal will involve the leakage of the video signal into the signal components of a band of less than 4 MHz passed from the band pass filter 14, which causes a correlation between the input signals applied to the first multiplier 16. This provides an output from the multiplier 16. The amplitude and polarity of the output signal depends on the state of the crosstalk due to the video signal. The output from the multiplier 16 is then connected as a control signal through the low-pass filter 17 to one input of the second multiplier 18 which forms part of the feedback generating means. The second multiplier 18 generates at its output a compensation signal applies it as a feedback signal to the subtractor 15.

At the subtractor 15, which acts as a mixing means, input signals to be supplied to the band pass filters 8 and 14 have subtracted therefrom the components of the feedback signal from the multiplier 18. In this connection, the feedback signal is the same in polarity and amplitude as the video signal mixed in the band of less than 4 MHz due to the fact that crosstalk occurs in the input signal, so that the subtraction of the feedback signal from the input signal through the subtractor 15 will cancel the crosstalk. In this case, since the band pass filter 14, the multipliers 16 and 18 and the subtractor 15 form a closed control loop, and the polarity and amplitude of the feedback signal is automatically controlled according to the amount of the crosstalk so as to minimize the crosstalk.

As a result, the band pass filter 8 provides the voice FM signal without crosstalk to the output terminal, thereby eliminating the buzz interference due to the voice signal.

The pass bands of the band pass filters 8 and 14 are different from each other. Thus, there may be a case where the waveform of the feedback signal from the second multiplier 18 is not completely the same as that of the video signal mixed in the voice FM signal which is included in the input signal at the input terminal 11. In fact, crosstalk will not occur selectively within the band of less than 4 MHz but will occur uniformly across that band. Even if crosstalk occurs somewhat selectively in the frequency band, proper selection of the frequency pass band of the band pass filter 14 can detect the crosstalk with substantially the same state as that occurring in the voice FM signal, thereby eliminating the voice buzz interference to the substantially complete extent. As to the feedback signal, it should be noted that a signal having the same state as the crosstalk is desirable, but is not essential. Substantially, the same state as the crosstalk is sufficient.

Since this provides an allowance for the voice buzz interference, the relative level of the voice FM signal can be lowered and the crosstalk from the voice FM signal to the video signal can be reduced, resulting in the reduction of the voice buzz interference and the video beat interference, at the same time.

Figure 3:
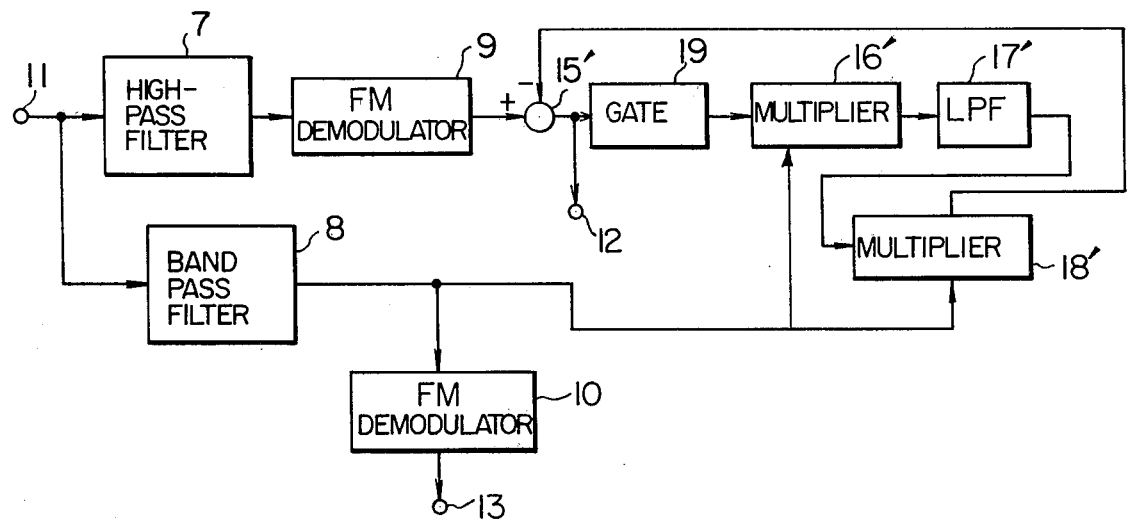

Turning next to FIG. 3, there is shown another embodiment of the crosstalk attenuator system according to the present invention. The embodiment of FIG. 3 is arranged so as to eliminate the crosstalk of the voice FM signal to the video signal. In the figure, a high-pass filter 7, an FM demodulator 9 and a band pass filter 8 are the same as in FIG. 2. In addition, a subtractor 15' is the same in construction, but differs in its position in the configuration.

A gate 19 opens to pass the selected portion of the input signal only during the horizontal or vertical fly-back time. A first multiplier 16' forms a relative analysis means and corresponds to the multiplier 16 in FIG. 2. A low-pass filter 17' corresponds to the filter 17 in FIG. 2. The time constant of the low-pass filter 17 is selected to be greater than the scanning period of the television signal. A second multiplier 18' forms part of a feedback signal generating means and corresponds to the multiplier 18 in FIG. 2.

It will be fully understood that as the gate 19, one known to those skilled in the art can be used and the gate signal to the gate can be also obtained from the video signal through the synchronizing signal separator circuit, in a known manner to one skilled in the art.

The operation of the crosstalk attenuator system according to the present invention in FIG. 3 will now be detailed in the following.

If the voice FM signal is not mixed into the video signal portion of the input signal, no voice FM signal components will be mixed in the video signal which passes through the gate 19 during the horizontal or vertical fly-back time. Therefore, there is no correlation between the inputs of the first multiplier 16', that is, between the voice FM signal from the band pass filter 8 and the signal from the gate 19. This will cause the multiplier 16' to produce no output feedback signal to applied from the second multiplier 18' to the subtractor 15', so that the output video signal of the subtractor 15' is equal to that received from the FM demodulator 9.

Where crosstalk occurs in the input signal, a mixture of the voice FM signal components into the video signal will provide a correlation between the two input signals of the multiplier 16' whereby the signal in accordance with the polarity and amplitude thereof appears at the output of the multiplier 16', as has been already explained in FIG. 2. The signal at the output of the multiplier 16' is sent as a control signal through the low-pass filter 17' to the second multiplier 18' which in turn produces as a feedback signal the voice FM signal according to the polarity and amplitude of the control signal and sends it to the subtractor 15'. The feedback signal is subtracted from the video signal applied from the FM demodulator 9. In this case, since the feedback signal from the multiplier 18' is the same as the voice FM signal mixed into the video signal of the input signal, in the same manner as in FIG. 2, subtraction of the feedback signal from the video signal from the FM demodulator 9 will cancel the voice FM signal component in the video signal from the FM demodulator 9, thereby eliminating the crosstalk.

The circuit from the subtractor 15' to the first and second multiplier provides a feedback loop so as to effect an automatic compensation according to the crosstalk amount and constantly minimize the crosstalk of the voice FM signal to the video signal.

The signal supplied to the feedback loop, in the arrangement of FIG. 3, is not the complete video signal but only the video signal received during the horizontal or vertical flyback period, due to the gate 19. However, the crosstalk during the flyback period will not differ much from the one during the scanning period. Due to the low pass filter 17', the feedback signal from the second multiplier 18' will be supplied continuously to the subtractor 15' during the scanning period, thereby fully eliminating the crosstalk to the video signal during the scanning period. For simplicity sake, gate 19 can be eliminated to provide for continuous signal comparison.

As a result, according to the embodiment of FIG. 3, the video beat interference due to the voice FM signal can be fully eliminated, which results in an extremly high quality of the display.

In this case, this can also provide an allowance for the picture beat interference thereby to raise the relative level of the voice FM signal. This permits the voice buzz interference to be reduced without increasing the video beat interference.

Figure 4:
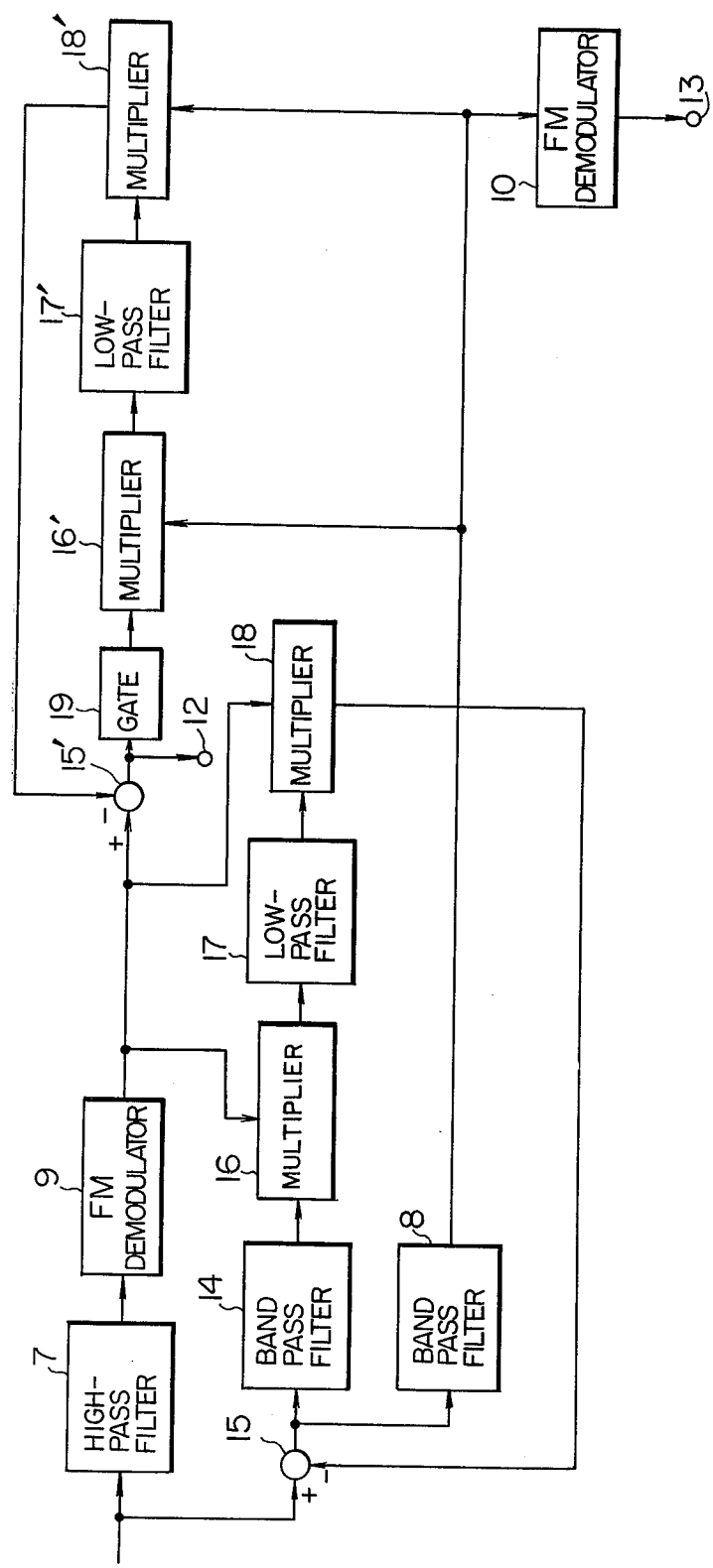

FIG. 4 shows a further embodiment of the crosstalk attenuator system according to the present invention and corresponds to a cascade connection of the embodiment of FIG. 2 and the embodiment of FIG. 3. In the figure, the crosstalk attenuator system is arranged so as to eliminate the voice buzz interference and then the video beat interference, but it can be carried out in the reverse order to the above, that is, to eliminate the video beat interference and then the voice buzz interference.

The arrangement and operation of each parts in FIG. 4 are the same as those in FIGS. 2 and 3, and therefore a detailed explanation of the embodiment in FIG. 4 will be omitted. In short, there is provided at an output terminal 13 the voice signal from which the voice buzz interference crosstalk has been eliminated, while, there is provided at an output terminal 12 the video signal from which the video beat interference crosstalk has been eliminated. In the explanation of each embodiment in the foregoing, although the multiplier 18 or 18' has been used, it is possible to replace it by a gain controlling circuit in an actual application.

That is, in many cases, the polarity of the feedback signal necessary to eliminate the crosstalk is fixed to be either positive or negative. For this reason, the gain control will suffice and no requirements of polarity change capability are needed.

The combination of the subtractor 15 or 15' with another inverter can form a general adder.

Although there have been shown in the foregoing embodiments in which the crosstalk due to the fundamental wave component of the voice FM signal is eliminated, the present invention can be applied as an alternative system in which the crosstalk due to the second harmonic wave of the voice FM signal is eliminated. In this arrangement, the signal consisting of the lower signal components in the video disc player is applied to the relative analysis means to approximate to the secondary distortion characteristic which is a main source of the above-mentioned non-linearity, and analysis of the relative relation between said signal and the video signal provides a signal to control the feedback signal generating means.

The embodiment with the above-mentioned arrangement will be described in more detail with reference to FIG. 5.

Parts of circuits already described with reference to the previous embodiments are denoted in FIG. 5. by the same reference numerals.

An adder 21 and a square-law circuit 22 are provided to approximate to the secondary distortion characteristic in the expression (1) (which has been given earlier). The square-law circuit can be formed, for example, by providing a common input to the two inputs of a typical two-input multiplier. In this case, as the multiplier, a known balanced modulator circuit can be used. An addition input 27 to the adder 21 is a control signal to control the bias of the square-law circuit 22. 23 is a gain controlling circuit and the gain thereof is controlled by a control signal 28. A subtractor 15 is used to eliminate the crosstalk components in the output of an FM demodulator 9 to obtain a 'clear' video signal without beat interference components. A gate 19 operates to extract the components that correspond to the retrace time from the input video signal. It will be understood by those skilled in the art that pulses (not shown) for the gate 19 can be obtained from a known synchronizing signal separator circuit as used in the television field. 16 is a multiplier for the fundamental wave which forms relative analysis means and in an actual application, can be provided as a balanced modulator circuit. One input of the multiplier 16 is connected to the output of the gate 19 and the other input thereof is connected to the output of a band pass filter (BPF) 8, that is, the fundamental wave of the voice FM signal. The output of the multiplier 16 is connected to a low-pass filter (LPF) 17 which produced a control signal 27 for compensating the offset (the quantity X in equation (1). A band pass filter (BPF) 24 is provided to remove the fundamental wave of the voice signal and the direct current components. 25 is another multiplier for cross terms which forms part of the feedback signal generating means. The multiplier 25 normally operates in accordance with the second harmonic frequency component of the voice FM signal in the video signal. In a system in which two voice FM signals are recorded at the same time, however, the multiplier 25 can also make a relative detection according to the frequency difference between the two signals.

A low pass filter (LPF) 26 functions to produce a gain control signal 28. The time constants of the low-pass filters 17 and 26 are selected to be longer than the scanning period of the television signal.

Figure 5:
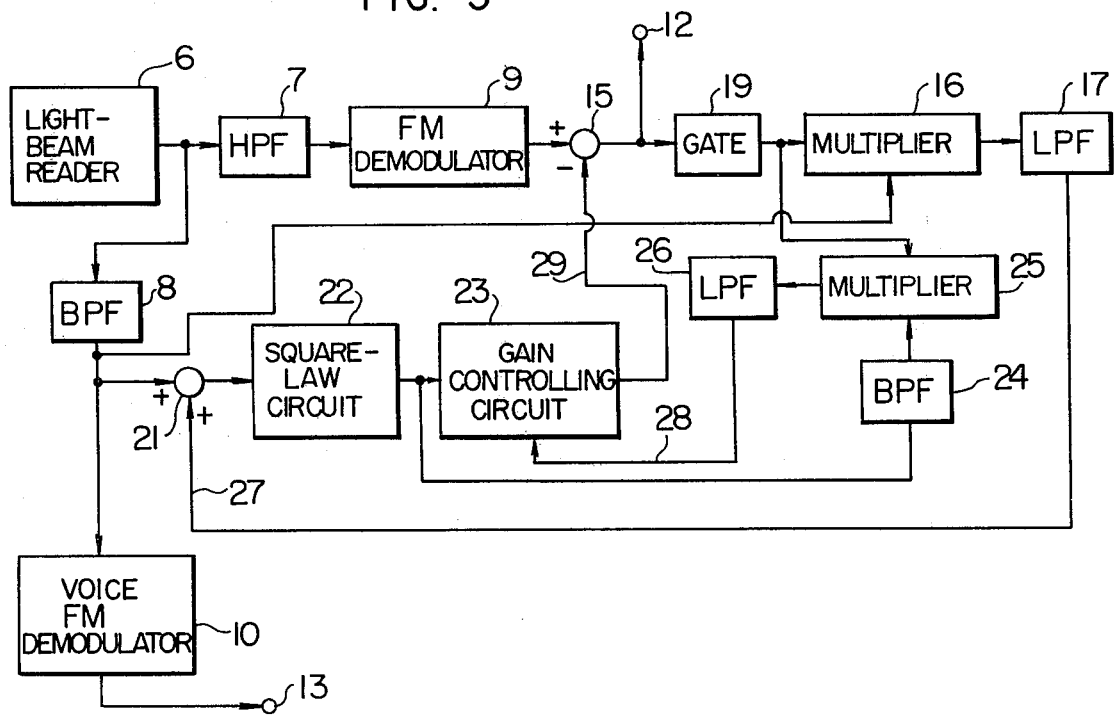

Next, explanation will be concentrated on the multiplier 16 and the adder 21 which form the core of the embodiment of FIG. 5. Suppose that there is no fundamental wave crosstalk in the video signal. In this case, the output of the multiplier 16 is zero and thus the control signal is zero. Accordingly, the fundamental component in the output of the square-law circuit 22, and hence the fundamental wave component in the feedback signal 29 are also zero. On the other hand, if there remains a positive (which means to be in phase with the output of band pass filter 8) fundamental wave crosstalk in the video signal output, then the output of the multiplier 16 becomes positive and thus the square-law circuit 22 generates a positive fundamental component in the feedback signal 29. Accordingly, the subtractor 15 acts to provide a negative feedback operation to cancel the fundamental wave crosstalk in the video signal output. Even if the fundamental wave crosstalk has a reverse polarity to the feedback signal, the subtractor 15 functions to provide a reverse feedback operation to cancel the crosstalk.

Explanation will proceed about the second harmonic wave component. It will be seen from expression (1) that the second harmonic wave crosstalk exists as a substantially constant amount independently of offset X. Therefore, it is common for the crosstalk to exist as a substantially constant amount and for the polarity of the crosstalk to be also constant. For this reason, cancellation of the crosstalk requires only the control of the amount of the crosstalk without changing the polarity thereof. It will be seen from this that the crosstalk can be removed by means of the multiplier 25 and the gain controlling circuit 23. In some practical cases, it is possible to simply replace the gain controlling circuit 23 with a constant gain amplifier, eliminating the multiplier 25, band pass filter (BPF) 24 and the low-pass filter 26.

In the above-mentioned explanation, if the fundamental wave crosstalk is not in phase or in reverse phase with the output fundamental wave of the band pass filter 8 but has a 90 degree phase difference therewith, it is inconvenient for the embodiment described. However, this can be easily removed by matching the phase characteristic or delay time characteristic of the band pass filter 8 to that of the video FM signal side. As an alternative, it is also possible to produce another fundamental wave component with a 90 degree phase difference from the band pass filter 8, to make duplicate the configuration of the portion subsequent to the adder 21, and to share only the subtractor 15. In this connection, the gate 19 is not necessarily required and thus in some cases, it can be omitted by selecting the time constants of the low-pass filters 17 and 26 to be sufficiently large. This is because the frequencies of the voice FM signal as an input reference signal of the multiplier 16 are concentrated on about 2 MHz, and it has a very low possibility of the 2 MHz component in the input video signal to be in phase with the voice FM reference signal for a long It will be appreciated that, while the present invention has been described with reference to the illustrated embodiments in which a single voice signal is processed, the present invention may be applied to a system in which a plurality of sub-signals at the lower-frequency, for example, a plurality of voice signals are processed.

Such a system can be achieved simply by providing a plurality of band pass filters 8 such as shown in FIG. 3 for each frequency band and by applying the signal from each of a plurality of band pass filters to the first and second multiplier 16' and 18' in parallel, without the need to increase the number of multipliers. Next, explanation will be made of an embodiment of the multiplier used in the relative analysis means and feedback signal generating means according to the present invention.

Referring to FIG. 6, there is shown an embodiment of the multiplier in which 81 is a first input terminal, 82 is a second input terminal and 83 is an output terminal. In the illustrated embodiment, 84 to 86 are batteries of about 12 V, 6 V and 3 V, respectively. In addition, 87 is a current source which provides about 4 mA. 88 to 93 are transistors, 94 and 95 are resistors of about 250 ohms, and 96 is a resistor of about 1.5 kiloohms. The operation of the multiplier of FIG. 6 is as follows.

A signal is supplied from the input terminal 81 to the differential amplifiers 92 and 93 which amplify it to produce at the collectors output signals in reverse phase with each other. These collector signals are connected to each common emitter pair of two pairs of the transistors 88, 89 and 90, 91. The ratio of emitter currents in each pair of transistors is determined by the difference between the potential at the second input terminal 82 and the positive level of the battery 85 (about 6 V). If the potential at the terminal 82 is higher than that of the battery 85, the emitter current of the inside transistors 89 and 90 will increase; and on the other hand, when it is lower, the emitter current of the same transistors 89 and 90 will decrease.

Now, the above explanation will be made according to quantitative analysis, that is, theoretically. Each of the quantities are assumed as follows.

The current of constant current source; $I_S$ (about 4 mA)
The values of the resistors 94 and 95: $R_E$ (about 250 ohms)
The input voltage at the first input terminal with respect to the reference voltage of the battery or voltage source 86: $V_1$
The input voltage at the second input terminal with respect to the reference voltage of the battery or voltage source 85: $V_2$
The current through the load resistor 96: $I_L$
The collector current in the transistor 89: $I_1$
The collector current in the transistor 91: $I_2$
The current amplification factor for each transistor: appropriate value
The value of the load resistor 96: $R_L$ (about 1.5 kiloohms)
The charge of an electron: 'q'
Boltzmann constant: k
Absolute temperature: T
kT/q: About 26 mV $$I_1 \approx \left(\frac{I_S}{2} + \frac{V_1}{2R_E}\right)\left(\frac{1}{2} + \frac{qV_2}{2kT}\right)$$

$$I_2 \approx \left(\frac{I_S}{2} - \frac{V_1}{2R_E}\right)\left(\frac{1}{2} - \frac{qV_2}{2kT}\right)$$

Therefore, $I_L =$ $$I_1 + I_2 = \frac{I_S}{2} + \frac{qV_1V_2}{2R_EkT} \approx 2\,mA + \frac{V_1V_2}{500\,\Omega \times 26\,mV}$$

Terminal voltage across $R_L = I_L R_L \approx 3V + \frac{3V_1V_2}{26\,mV}$

From this expression, multiplication $V_1V_2$ of the first input signal by the second input signal appears across $R_L$ or the resistor 96. In order the ease the dynamic range of linearity requirement of the multiplier 16, 16', 25 in the aformentioned embodiments, it is possible to place a band pass filter at the video signal input side, the characteristics of which can be approximately the same as that of the band pass filter at the other input side of the multiplier.

While the invention has been disclosed with reference to the embodiments based on a light-beam video player, it should be understood that the invention is not limited to the particular embodiments and can be applied to another type of video player. For example, to an electrostatic or piezo-electric type video player in which the video signal and the voice signal are recorded on the same track in the same manner as in the above-mentioned light-beam video player, the present invention can be applied.

Further, the present invention can be applied to a public video tape recorder known as an M system. In such a type of video tape recorder, since the voice signal is usually recorded on a track different from the video signal, such crosstalk as has been described above in connection with the present invention will not occur between the video and voice signals.

However, the luminance signal and the color signal in the video signal are frequency separated and recorded on the same track, as in the illustrated embodiments. In comparison with the above-mentioned embodiments according to the present invention, the luminance FM signal in the video tape recorder corresponds to the video FM signal in the video player, and lower frequency conversion/carrier color signal in the video tape recorder corresponds to the voice FM signal in the video player. It will be obvious from this explanation that the present invention can be also applied to such a video tape recorder.

In a magnetic recording system such as a video tape recorder, such limiter 4 as has explained in FIG. 1 is not used usually. This is because the magnetic tape material itself has such limiting effect. Therefore, the explanation in connection with FIG. 1 can be true for this video tape recorder, whether the degree of the crosstalk is heavier or lighter.

Although the present invention has been disclosed with reference to the particular embodiments, the invention can be generally applied to any system in which such a multiplexed signal as having a frequency spectrum in FIG. 7 is demodulated and reproduced, so as to reduce the crosstalk.

Turning now to FIG. 7, a main modulated signal 31 is placed within a first frequency range, that is, $f_1 \pm f_1/2$; and a multiplexed sub-signal 32 is within a second frequency range, that is, from 0 to $f_1/2$. The main modulated signal includes a synchronizing signal and a luminance signal which are time shared. Further, such crosstalk as shown in FIG. 7 with a dotted line occurs due to the fact that a non-linear characteristic exists in the process prior to the reproduction unit. Under such conditions, use of the present invention will automatically reduce the crosstalk components. With the arrangement as has been disclosed, the present invention achieves such an advantage that both of the voice buzz interference and the video beat interference in a video disc player or a video tape recorder (which have been difficult to remove because of their inconsistent characteristic hitherto) can be reduced at the same time so as to provide high quality voice and picture, thereby resulting in an improved performance and reduced cost of the video player or video tape recorder.

In addition, since, at the time of recording on discs, a relatively loose offset is allowed for the discs, the discs can be manufactured with less rejection rate, which leads to low cost per disc.

While the present invention has been described with reference to the preferred embodiments shown in the drawings, it should be understood that the invention is not limited to those embodiments but includes all other possible modifications, alternations and equivalent arrangements within the scope of appended claims.

I claim:

1. A crosstalk attenuator system in which a high-frequency main signal and a low-frequency sub-signal, which have been recorded as a frequency multiplexed compound signal on the same track of a recording medium, are reproduced as a video and a voice signal from the compound signal through reproduction and demodulation, said system comprising:

first signal separating means connected to receive said compound signal for separating a higher frequency portion of said compound signal which higher frequency includes said main signal, from said compound signal;

signal demodulating means connected to receive the output of said first signal separating means for generating a first signal component which is a demodulated signal of said higher frequency portion;

second signal separating means connected to receive said compound signal for separating a second signal component, which is a part of a lower frequency portion of said compound signal and said lower frequency portion includes said sub-signal, from said compound signal;

third signal separating means connected to receive said compound signal for separating a third signal component, which is a part of said lower frequency portion of said compound signal and excludes said sub-signal, from said compound signal;

relative analysis means connected to receive the outputs of said third signal separating means and said signal demodulating means, and including a multiplier, for comparing said first and said third signal components to generate an output signal according to the amount of crosstalk which appears from said first signal component as a crosstalk signal in said second signal component;

feedback signal generating means connected to receive the outputs of said relative analysis means and said signal demodulating means for generating a feedback signal which is equivalent to said crosstalk signal from said first signal component in accordance with said output signal of said relative analysis means; and compensation means connected to receive said compound signal and the output of said feedback signal generating means for subtracting said feedback signal from said second and third signal components, respectively, whereby said compensation means generates said sub-signal with an attenuated crosstalk signal, the output of said compensation means being applied to the inputs of said second and said third signal separating means.

2. A crosstalk attenuator system in which a high-frequency main signal and a low-frequency sub-signal, which have been recorded as a frequency multiplexed compound signal on the same track of a recording medium, are reproduced as video and voice signal from the compound signal through reproduction and demodulation, said system comprising:

first signal separating means connected to receive said compound signal for separating a from said compound signal higher frequency portion of said compound signal which said higher frequency portion includes said main signal, signal demodulating means connected to receive the output of said first signal separating means for generating a first signal component which is a demodulated signal of said higher frequency portion;

second signal separating means connected to receive said compound signal for separating a second signal component, which is a lower frequency portion of said compound signal and includes said sub-signals from said compound signal;

relative analysis means, including a multiplier, for comparing said first and said second signal components to generate an output signal according to the amount of crosstalk which appears from said second signal component as a crosstalk signal in said first signal component;

signal supplying means for supplying said first signal component to said relative analysis means during a selected time period of said main signal;

feedback signal generating means connected to receive the outputs of said second signal separating means and said relative analysis means, for generating a feedback signal which is equivalent to said crosstalk signal from said second signal component in accordance with said output signal of said relative analysis means; and compensation means connected to receive the outputs of said signal demodulating means and said feedback signal generating means for subtracting said feedback signal from said first signal component, whereby said compensation means generates said main signal with an attenuated crosstalk signal, the output of said compensation means being applied to the input of said signal supplying means.

3. A crosstalk attenuator system as defined in claim 2, wherein said feedback signal generating means comprises a square-law circuit, a gain controlling circuit and a multiplier circuit; said square-law circuit comprising means to square said second signal component, said multiplier circuit comprising means to analyze the correlation between said first signal component and an output signal of said square-law circuit, and said gain controlling circuit comprising means to amplify said output signal of said square-law circuit according to the level of said output signal of said multiplier circuit.

4. A crosstalk attenuator system as defined in claim 2, wherein said feedback signal generating means comprises a square-law circuit and a gain controlling circuit; wherein said square-law circuit squares said second signal component, and said gain controlling circuit amplifies said output signal of said square-law circuit with a constant gain.

5. For use in a crosstalk attenuator system, a detecting system, in which a first signal and a second signal, which have been recorded as a frequency multiplexed compound signal on the same recording medium, are reproduced as a video and a voice signal from said compound signal through reproduction and demodulation, wherein said detecting system includes means to generate a crosstalk detecting signal the level of which is in accordance with a crosstalk signal component which appears from one of said first and second signals in the other of said first and said second signals, said detecting system comprising, first signal separating means for separating a higher frequency component of said compound signal, which includes said first signal, from said compound signal;

second signal separating means for separating a lower frequency component of said compound signal, which includes said second signal, from said compound signal;

third signal separating means for separating said crosstalk signal component which appears in one of said higher or lower frequency components at a different frequency region or a different time region as compared to the frequency region or the time region in which said first or said second signal appears;

and multiplier means connected to receive an output signal of said third signal separating means and an output signal of said first or said second signal separating means for generating a product signal of said two output signals as said crosstalk detecting signal.

* * * * *